(12) United States Patent  
Chun et al.

(10) Patent No.: US 9,161,306 B2
(45) Date of Patent: *Oct. 13, 2015

(54) METHOD FOR TRANSITIONING BETWEEN MULTIPLE RECEPTION LEVELS

(71) Applicant: LG Electronics Inc., Seoul (KR)

(72) Inventors: Sung Duck Chun, Anyang-si (KR); Young Dae Lee, Anyang-si (KR); Sung Jun Park, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/046,354

(22) Filed: Oct. 4, 2013

(65) Prior Publication Data

US 2014/0036752 A1 Feb. 6, 2014

Related U.S. Application Data

(63) Continuation of application No. 13/239,232, filed on Sep. 21, 2011, now Pat. No. 8,576,741, which is a continuation of application No. 12/311,803, filed as application No. PCT/KR2007/005368 on Oct. 30, 2007, now Pat. No. 8,054,758.

(Continued)

(30) Foreign Application Priority Data

Mar. 9, 2007 (KR) ..................... 10-2007-0023636

(51) Int. Cl.
*H04J 3/14* (2006.01)
*H04W 52/02* (2009.01)
*H04W 76/04* (2009.01)

(52) U.S. Cl.
CPC ...... *H04W 52/0229* (2013.01); *H04W 52/0216* (2013.01); *H04W 76/048* (2013.01); *Y02B 60/50* (2013.01)

(58) Field of Classification Search
CPC .................................. H04W 52/0229
USPC .......................... 370/241, 248, 252, 431, 449
See application file for complete search history.

(56) References Cited

U.S. PATENT DOCUMENTS 4,205,200 A 5/1980 Dharia et al.
5,894,595 A 4/1999 Foladare et al.
(Continued)

FOREIGN PATENT DOCUMENTS

CN 1438779 A 8/2003
CN 1719932 1/2006
(Continued)

OTHER PUBLICATIONS

Nokia et al: "UL reporting rate for DL quality measurements in CELL_FACH", 3GPP Draft; R2-071404 HS-FACH UL Reporting Draft RAN2 Issues V4, 3rd Generation Partnership Project (3GPP), Mobile Competence Centre; 650, Route Des Lucioles ; F-06921Sophia-Antipolis Cedex ; France,vol. RAN WG2, No. St. Julian; 20070402,Apr. 2, 2007, XP050134343,[retrieved on Apr. 4, 2007]* Tranmission of UE measurements usingRACH while the UE is in Cell PCH.

(Continued)

*Primary Examiner* — Ricky Ngo
*Assistant Examiner* — Wei-Po Kao
(74) *Attorney, Agent, or Firm* — Dentons US LLP

(57) ABSTRACT

There is provided a method for enabling a user equipment (UE) to transition between a non-discontinuous reception (Non-DRX) level and at least one discontinuous reception (DRX) level. The UE in a DRX level wakes up periodically to monitor a scheduling channel. The method includes receiving a DRX indicator in a Non-DRX level with continuously monitoring the scheduling channel and transitioning from the Non-DRX level to a DRX level indicated by the DRX indicator. The UE can transition between multiple DRX levels by an explicit command/signaling.

6 Claims, 10 Drawing Sheets

Related U.S. Application Data

(60) Provisional application No. 60/863,545, filed on Oct. 30, 2006, provisional application No. 60/884,401, filed on Jan. 10, 2007.

(56) References Cited

U.S. PATENT DOCUMENTS

| | | |
|---|---|---|
| 6,157,833 A | 12/2000 | Lawson-Jenkins et al. |
| 6,173,057 B1 | 1/2001 | Truong et al. |
| 6,324,171 B1 | 11/2001 | Lee et al. |
| 6,353,628 B1 | 3/2002 | Wallace et al. |
| 6,526,027 B1 | 2/2003 | Yeom |
| 6,567,409 B1 | 5/2003 | Tozaki et al. |
| 6,725,267 B1 | 4/2004 | Hoang |
| 6,795,419 B2 | 9/2004 | Parantainen et al. |
| 7,197,317 B2 | 3/2007 | Parkvall et al. |
| 7,245,707 B1 | 7/2007 | Chan |
| 7,400,636 B2 | 7/2008 | Kim et al. |
| 7,443,813 B2 | 10/2008 | Hwang et al. |
| 7,457,588 B2 | 11/2008 | Love et al. |
| 7,525,908 B2 | 4/2009 | Olsson et al. |
| 7,551,643 B2 | 6/2009 | Yeo et al. |
| 7,680,058 B2 | 3/2010 | Seurre et al. |
| 7,769,351 B2 | 8/2010 | Kwak et al. |
| 7,801,527 B2 | 9/2010 | Putcha |
| 7,864,731 B2 | 1/2011 | Forsberg |
| 7,912,471 B2 | 3/2011 | Kodikara Patabandi et al. |
| 7,916,697 B2 | 3/2011 | Eklund |
| 7,958,542 B2 | 6/2011 | Herrmann |
| 8,064,676 B2 | 11/2011 | Li et al. |
| 8,427,997 B2 | 4/2013 | Ren et al. |
| 8,582,482 B2 | 11/2013 | Hsu |
| 8,582,487 B2 | 11/2013 | Gou et al. |
| 8,588,100 B2 | 11/2013 | Wei |
| 8,599,706 B2 | 12/2013 | Damnjanovic et al. |
| 8,614,971 B2 | 12/2013 | Kim et al. |
| 8,634,312 B2 | 1/2014 | Chun et al. |
| 2001/0012787 A1 | 8/2001 | Wortham |
| 2001/0017850 A1 | 8/2001 | Kalliokulju et al. |
| 2001/0034791 A1 | 10/2001 | Clubb et al. |
| 2001/0044322 A1 | 11/2001 | Raaf |
| 2002/0028690 A1 | 3/2002 | McKenna et al. |
| 2002/0057663 A1 | 5/2002 | Lim |
| 2002/0059464 A1 | 5/2002 | Hata et al. |
| 2002/0091860 A1 | 7/2002 | Kalliokulju et al. |
| 2003/0007490 A1 | 1/2003 | Yi et al. |
| 2003/0007512 A1 | 1/2003 | Tourunen et al. |
| 2003/0016698 A1 | 1/2003 | Chang et al. |
| 2003/0039270 A1 | 2/2003 | Chang et al. |
| 2003/0050078 A1 | 3/2003 | Motegi et al. |
| 2003/0119488 A1 | 6/2003 | Hans et al. |
| 2003/0123485 A1 | 7/2003 | Yi et al. |
| 2003/0125056 A1 | 7/2003 | Jiang |
| 2003/0147371 A1 | 8/2003 | Choi et al. |
| 2003/0165122 A1 | 9/2003 | Westphal |
| 2003/0165133 A1 | 9/2003 | Garani |
| 2003/0189922 A1 | 10/2003 | Howe |
| 2003/0207696 A1 | 11/2003 | Willenegger et al. |
| 2003/0227875 A1 | 12/2003 | Wei et al. |
| 2004/0014452 A1 | 1/2004 | Lim et al. |
| 2004/0028078 A1 | 2/2004 | Beckmann et al. |
| 2004/0042507 A1 | 3/2004 | Pelletier et al. |
| 2004/0087320 A1 | 5/2004 | Kim et al. |
| 2004/0100940 A1 | 5/2004 | Kuure et al. |
| 2004/0117860 A1 | 6/2004 | Yi et al. |
| 2004/0121771 A1 | 6/2004 | Song et al. |
| 2004/0127265 A1 | 7/2004 | Van Bosch et al. |
| 2004/0148427 A1 | 7/2004 | Nakhjiri et al. |
| 2004/0176112 A1 | 9/2004 | Beckmann et al. |
| 2004/0180675 A1 | 9/2004 | Choi et al. |
| 2004/0185837 A1 | 9/2004 | Kim et al. |
| 2004/0202107 A1 | 10/2004 | Bensimon et al. |
| 2004/0229605 A1 | 11/2004 | Hwang et al. |
| 2004/0233870 A1 | 11/2004 | Willenegger et al. |
| 2004/0242195 A1 | 12/2004 | Chun et al. |
| 2004/0253959 A1 | 12/2004 | Hwang et al. |
| 2005/0009527 A1 | 1/2005 | Sharma |
| 2005/0018624 A1 | 1/2005 | Meier et al. |
| 2005/0032555 A1 | 2/2005 | Jami et al. |
| 2005/0041610 A1 | 2/2005 | Lee et al. |
| 2005/0041681 A1 | 2/2005 | Lee et al. |
| 2005/0054365 A1 | 3/2005 | Ahn et al. |
| 2005/0063347 A1 | 3/2005 | Sarkkinen et al. |
| 2005/0085254 A1 | 4/2005 | Chuah et al. |
| 2005/0094670 A1 | 5/2005 | Kim |
| 2005/0100048 A1 | 5/2005 | Chun et al. |
| 2005/0141462 A1 | 6/2005 | Aerrabotu et al. |
| 2005/0141471 A1 | 6/2005 | Virtanen et al. |
| 2005/0141541 A1 | 6/2005 | Cuny et al. |
| 2005/0160184 A1 | 7/2005 | Walsh et al. |
| 2005/0164719 A1 | 7/2005 | Waters |
| 2005/0176430 A1 | 8/2005 | Lee et al. |
| 2005/0176474 A1 | 8/2005 | Lee et al. |
| 2005/0180378 A1 | 8/2005 | Lee et al. |
| 2005/0185620 A1 | 8/2005 | Lee et al. |
| 2005/0232271 A1 | 10/2005 | Kettunen et al. |
| 2005/0238051 A1 | 10/2005 | Yi et al. |
| 2005/0265294 A1 | 12/2005 | Hu et al. |
| 2005/0286470 A1 | 12/2005 | Asthana et al. |
| 2005/0288022 A1 | 12/2005 | Ryu et al. |
| 2006/0013165 A1 | 1/2006 | Choi et al. |
| 2006/0067324 A1 | 3/2006 | Kim et al. |
| 2006/0067364 A1 | 3/2006 | Jung et al. |
| 2006/0087994 A1 | 4/2006 | Barth et al. |
| 2006/0098567 A1 | 5/2006 | Willenegger et al. |
| 2006/0098688 A1 | 5/2006 | Parkvall et al. |
| 2006/0126554 A1 | 6/2006 | Motegi |
| 2006/0133424 A1 | 6/2006 | Han et al. |
| 2006/0165045 A1 | 7/2006 | Kim et al. |
| 2006/0187846 A1 | 8/2006 | Pelletier et al. |
| 2006/0203760 A1 | 9/2006 | Fukui et al. |
| 2006/0209870 A1 | 9/2006 | Lee et al. |
| 2006/0218271 A1 | 9/2006 | Kasslin et al. |
| 2006/0245417 A1 | 11/2006 | Conner et al. |
| 2006/0251105 A1 | 11/2006 | Kim et al. |
| 2006/0262811 A1 | 11/2006 | Jiang |
| 2007/0014229 A1 | 1/2007 | Helper et al. |
| 2007/0024972 A1 | 2/2007 | Kuerz et al. |
| 2007/0032219 A1 | 2/2007 | Rudolf et al. |
| 2007/0041382 A1 | 2/2007 | Vayanos et al. |
| 2007/0047452 A1 | 3/2007 | Lohr |
| 2007/0047582 A1 | 3/2007 | Malkamaki |
| 2007/0060139 A1 | 3/2007 | Kim et al. |
| 2007/0064608 A1 | 3/2007 | Rinne et al. |
| 2007/0064631 A1 | 3/2007 | Tseng et al. |
| 2007/0076667 A1 | 4/2007 | Kashima et al. |
| 2007/0155389 A1 | 7/2007 | Zhang |
| 2007/0165567 A1 | 7/2007 | Tan et al. |
| 2007/0165635 A1 | 7/2007 | Zhang et al. |
| 2007/0177569 A1 | 8/2007 | Lundby |
| 2007/0178875 A1 | 8/2007 | Rao et al. |
| 2007/0189332 A1 | 8/2007 | Phan et al. |
| 2007/0201369 A1 | 8/2007 | Pedersen et al. |
| 2007/0206531 A1 | 9/2007 | Pajukoski et al. |
| 2007/0223527 A1 | 9/2007 | Shao et al. |
| 2007/0248075 A1 | 10/2007 | Liu et al. |
| 2007/0258591 A1 | 11/2007 | Terry et al. |
| 2007/0291646 A1 | 12/2007 | Ohishi et al. |
| 2007/0291673 A1 | 12/2007 | Demirhan et al. |
| 2007/0291695 A1 | 12/2007 | Sammour et al. |
| 2007/0291719 A1 | 12/2007 | Demirhan et al. |
| 2007/0291728 A1* | 12/2007 | Dalsgaard et al. ............ 370/347 |
| 2007/0291729 A1 | 12/2007 | Dalsgaard et al. |
| 2007/0291788 A1 | 12/2007 | Sammour et al. |
| 2007/0293224 A1 | 12/2007 | Wang et al. |
| 2008/0009289 A1 | 1/2008 | Kashima et al. |
| 2008/0043619 A1 | 2/2008 | Sammour et al. |
| 2008/0056198 A1 | 3/2008 | Charpentier et al. |
| 2008/0056273 A1 | 3/2008 | Pelletier et al. |
| 2008/0064390 A1 | 3/2008 | Kim |
| 2008/0076359 A1 | 3/2008 | Charpentier et al. |
| 2008/0089285 A1 | 4/2008 | Pirskanen et al. |
| 2008/0089292 A1 | 4/2008 | Kitazoe et al. |
| 2008/0095185 A1 | 4/2008 | DiGirolamo et al. |

(56) References Cited

U.S. PATENT DOCUMENTS

| | | |
|---|---|---|
| 2008/0101268 A1 | 5/2008 | Sammour et al. |
| 2008/0137573 A1 | 6/2008 | Cave et al. |
| 2008/0167089 A1* | 7/2008 | Suzuki et al. ............... 455/574 |
| 2008/0170531 A1 | 7/2008 | Petry et al. |
| 2008/0181127 A1 | 7/2008 | Terry et al. |
| 2008/0182594 A1 | 7/2008 | Flore et al. |
| 2008/0186946 A1 | 8/2008 | Marinier et al. |
| 2008/0188223 A1 | 8/2008 | Vesterinen et al. |
| 2008/0225744 A1 | 9/2008 | DiGirolamo et al. |
| 2008/0225765 A1 | 9/2008 | Marinier et al. |
| 2008/0240439 A1 | 10/2008 | Mukherjee et al. |
| 2008/0267126 A1 | 10/2008 | Vujcic |
| 2008/0268850 A1 | 10/2008 | Narasimha et al. |
| 2008/0273610 A1 | 11/2008 | Malladi et al. |
| 2008/0280567 A1 | 11/2008 | Sharma |
| 2008/0287091 A1 | 11/2008 | Suzuki et al. |
| 2008/0310452 A1 | 12/2008 | Vedantham et al. |
| 2009/0022107 A1 | 1/2009 | Kapoor et al. |
| 2009/0040982 A1 | 2/2009 | Ho et al. |
| 2009/0086659 A1 | 4/2009 | Pani et al. |
| 2009/0086710 A1 | 4/2009 | Ho |
| 2009/0092076 A1 | 4/2009 | Zheng et al. |
| 2009/0109912 A1 | 4/2009 | DiGirolamo et al. |
| 2009/0124259 A1 | 5/2009 | Attar et al. |
| 2009/0143074 A1 | 6/2009 | Pelletier et al. |
| 2009/0163199 A1 | 6/2009 | Kazmi et al. |
| 2009/0181710 A1 | 7/2009 | Pani et al. |
| 2009/0207771 A1 | 8/2009 | Lindskog |
| 2009/0239538 A1 | 9/2009 | Motegi et al. |
| 2009/0264164 A1 | 10/2009 | Chun et al. |
| 2009/0318170 A1 | 12/2009 | Lee et al. |
| 2010/0027413 A1 | 2/2010 | Park et al. |
| 2010/0061330 A1 | 3/2010 | Hanov |
| 2010/0128669 A1 | 5/2010 | Chun et al. |
| 2010/0165901 A1 | 7/2010 | Kim |
| 2010/0227614 A1 | 9/2010 | Chun et al. |
| 2010/0238799 A1 | 9/2010 | Sebire |
| 2010/0238903 A1 | 9/2010 | Kitazoe |
| 2010/0272004 A1 | 10/2010 | Maeda et al. |
| 2010/0309877 A1 | 12/2010 | Damnjanovic et al. |
| 2011/0039536 A1 | 2/2011 | Lee et al. |
| 2011/0090836 A1 | 4/2011 | Mochizuki et al. |
| 2011/0116436 A1 | 5/2011 | Bachu et al. |
| 2012/0002589 A1 | 1/2012 | Saifullah et al. |

FOREIGN PATENT DOCUMENTS

| | | |
|---|---|---|
| EP | 1 148 735 A1 | 10/2001 |
| EP | 1148753 A2 | 10/2001 |
| EP | 1 168 877 | 1/2002 |
| EP | 1 209 938 | 5/2002 |
| EP | 1 304 898 A1 | 4/2003 |
| EP | 1304898 A1 | 4/2003 |
| EP | 1 315 356 | 5/2003 |
| EP | 1315356 A2 | 5/2003 |
| EP | 1 318 632 | 6/2003 |
| EP | 1 337 124 A2 | 8/2003 |
| EP | 1 372 310 | 12/2003 |
| EP | 1 420 551 | 5/2004 |
| EP | 1 501 328 | 1/2005 |
| EP | 1499144 | 1/2005 |
| EP | 1 511 245 | 3/2005 |
| EP | 1594284 A2 | 11/2005 |
| EP | 1 720 322 | 11/2006 |
| EP | 1 720 373 | 11/2006 |
| EP | 1932380 | 6/2008 |
| EP | 2087653 | 8/2009 |
| JP | 06-006294 | 1/1994 |
| JP | 2002-539686 | 11/2002 |
| JP | 2003-504935 | 2/2003 |
| JP | 2003-087180 | 3/2003 |
| JP | 2003-087180 A | 3/2003 |
| JP | 2003-196775 A | 7/2003 |
| JP | 2003-235064 | 8/2003 |
| JP | 2004-134904 A | 4/2004 |
| JP | 2005-039726 A | 2/2005 |
| JP | 2005-057787 A | 3/2005 |
| JP | 2005-260906 | 9/2005 |
| JP | 2005-260906 A | 9/2005 |
| JP | 2005-318131 A | 11/2005 |
| JP | 2005-354488 | 12/2005 |
| JP | 2006-505979 | 2/2006 |
| JP | 2006-067115 | 3/2006 |
| JP | 2006-515737 | 6/2006 |
| JP | 2006-528456 A | 12/2006 |
| JP | 2007-165635 | 6/2007 |
| JP | 2008-535370 | 8/2008 |
| JP | 2008-539678 | 11/2008 |
| JP | 2009-540721 | 11/2009 |
| JP | 2009-542100 | 11/2009 |
| KR | 10-2000-0039404 A | 7/2000 |
| KR | 10-2001-0080174 A | 8/2001 |
| KR | 2001-0105240 | 11/2001 |
| KR | 10-2003-0005537 A | 1/2003 |
| KR | 10-2003-0093604 | 12/2003 |
| KR | 10-2004-0005834 A | 1/2004 |
| KR | 10-2004-0039944 A | 5/2004 |
| KR | 2004-0048675 | 6/2004 |
| KR | 10-2004-0086950 | 10/2004 |
| KR | 10-2005-0008440 A | 1/2005 |
| KR | 2005-0027972 | 3/2005 |
| KR | 10-2005-0053376 A | 6/2005 |
| KR | 10-2005-0063174 A | 6/2005 |
| KR | 10-2005-0096763 A | 6/2005 |
| KR | 10-595646 A | 7/2005 |
| KR | 10-2006-0048373 A | 5/2006 |
| KR | 10-2006-0091525 A | 8/2006 |
| KR | 10-2007-0006850 A | 1/2007 |
| KR | 10-2007-0024302 A | 3/2007 |
| KR | 10-2007-0038425 | 4/2007 |
| KR | 10-2007-0047669 A | 5/2007 |
| KR | 10-0877078 | 1/2009 |
| RU | 2249917 C2 | 4/2005 |
| WO | 9904584 | 1/1999 |
| WO | WO 00/74416 | 12/2000 |
| WO | 01/78252 A1 | 10/2001 |
| WO | WO0239622 | 5/2002 |
| WO | WO02091659 | 11/2002 |
| WO | 2004017581 | 2/2004 |
| WO | 2004028050 | 4/2004 |
| WO | WO 2004/043094 | 5/2004 |
| WO | WO 2004/064272 A1 | 7/2004 |
| WO | 2004091246 | 10/2004 |
| WO | 2004-102833 A1 | 11/2004 |
| WO | WO 2004/102833 | 11/2004 |
| WO | WO 2005/015776 A1 | 2/2005 |
| WO | WO 2005/018098 | 2/2005 |
| WO | WO 2005048613 | 5/2005 |
| WO | 2005055472 A1 | 6/2005 |
| WO | WO 2005/067194 | 7/2005 |
| WO | 2006/034819 A1 | 4/2006 |
| WO | 2006049441 A1 | 5/2006 |
| WO | WO 2006/049441 | 5/2006 |
| WO | WO 2006/075820 | 7/2006 |
| WO | 2006104344 A2 | 10/2006 |
| WO | 2006110072 A1 | 10/2006 |
| WO | WO 2006/104344 | 10/2006 |
| WO | WO 2006/109851 | 10/2006 |
| WO | 2006116620 A2 | 11/2006 |
| WO | WO 2006/116620 | 11/2006 |
| WO | 2007/025138 A2 | 3/2007 |
| WO | WO 2007/025138 | 3/2007 |
| WO | WO 2007/052888 | 5/2007 |
| WO | WO 2007/078155 | 7/2007 |
| WO | WO 2007/078172 | 7/2007 |
| WO | WO 2007/078929 A2 | 7/2007 |
| WO | 2007/133034 A3 | 11/2007 |
| WO | WO 2007/133034 A2 | 11/2007 |
| WO | WO 2007/144757 | 12/2007 |
| WO | WO 2007/149509 | 12/2007 |
| WO | WO 2008/042889 | 4/2008 |
| WO | 2008051466 | 5/2008 |
| WO | WO 2008/054103 A1 | 5/2008 |

(56) References Cited

FOREIGN PATENT DOCUMENTS

| | | |
|---|---|---|
| WO | 2008/111684 A1 | 9/2008 |
| WO | WO 2008/111684 | 9/2008 |
| WO | 2009084998 A1 | 7/2009 |
| WO | WO 2009/084998 | 7/2009 |
| WO | WO 2009/084998 A1 | 7/2009 |

OTHER PUBLICATIONS

Nokia: "RACH reporting", 3GPP Draft; 24A000008, 3rd Generation Partnership Project (3GPP), Mobile Competence Centre ; 650, Route Des Lucioles ; F-06921 Sophia-Antipolis Cedex ; France, vol. RAN WG2, No. Sophia Antipolis,France; 20001110,Nov. 10, 2000, XP050141261, [retrieved on Nov. 10, 2000] * UE in Cell_PCH using DRX; p. 1.
Ericsson: "Enhanced Paging Procedure", 3GPP Draft; R2-070586, 3rd Generation Partnership Project (3GPP), Mobile Competence Centre ; 650, Route Des Lucioles ; F-06921 Sophia-Antipolis Cedex; France, vol. RAN WG2, No. St. Louis, USA; 20070209, Feb. 9, 2007, XP050133637, [retrieved on Feb. 9, 2007]* UE in Cell_PCH monitors PICH; UL transmission of user data/ measurements while the UE stays in Cell PCH.
Ericsson: "Issues on DRX in LTE Active", 3GPP Draft; R2-070797, 3rd Generation Partnership Project (3GPP), Mobile Competence Centre ; 650, Route Des Lucioles ; F-06921 Sophia-Ntipolis Cedex; France, vol. RAN WG2, No. St. Louis, USA; 20070209, Feb. 9, 2007, XP050133822, [retrieved on Feb. 9, 2007].
"DRX operations for connected mode UEs in LTE",3GPP Draft; R2-063120 DRX for Connected UE, 3rd Generation Partnership Project (3GPP), Mobile Competence Centre ; 650, Route Des Lucioles ; F-06921Sophia-Antipolis Cedex ; France, vol. RAN WG2, No. Riga, Latvia; 20061101, Nov. 1, 2006, XP050132629, [retrieved on Nov. 1, 2006].
Ericsson, "Issue on DRX in LTE Active." 3GPP TSG-RAN WG2 Meeting #57, R2-070797; St. Louis, Missouri, Feb. 12-16, 2007. pp. 1-3.
IPWireless, Nextwave Wireles, "RACH Access Optimisation." 3GPP TSG RAN WG2 #59, R2-073186, Athens, Greece, Jun. 20-24, 2007, pp. 1-6.
Panasonic, "Timer Handling for RACH Procedures." 3GPP TSG RAN WG2 #61, R2-080873, Sorrento, Italy Feb. 11-15, pp. 1-3.
NTT Docomo, Inc, "Contention-based and Contention-free Access Procedures in LTE." 3GPP TSG-RAN WG2 #57, R2-070778, Saint Louis, Feb. 12-16, 2007. pp. 1-3.
"Summary of email discussion on DRX control", 3GPP Draft; R2-07XXXX DRX Control LTE V6, 3rd Generation Partnership Project (3GPP), Mobile Competence Centre; 650, Route Des Lucioles; F-06921 Sophia-Antipolis Cedex; France. Mar. 23, 2007, XP050602959, (retrieved on Mar. 23, 2007) p. 3.
ZTE; "Mac Transition Document; For Discussion", 3GPP Draft; R2-060064, 3rd Generation Partnership Project (3GPP), Mobile Competence Centre; 650, Route Des Lucioles; F-06921 Sophia-Antipolis Cedex; France, vol. RAN WG2, No. Sophia Antipolis. France; 20060105, Jan. 5, 2006, XP050130225, (retrieved on Jan. 5, 2006). The Whole Document.
Nokia: "Active Mode DRX". 3GPP Draft; R2-062752 Active Mode DRX, 3rd Generation Partnership Project (3GPP), Mobile Competence Centre; 650, Route Des Lucioles; F-06921 Sophia-Antipolis Cedex; France. vol. RAN WG2, No. Seoul, Korea; 20061005, Oct. 5, 2006, XP050132285, (retrieved on Oct. 5, 2006). The Whole Document.
Nokia, "Discontinuous reception in CELL_FACH", 3GPP TSG-RAN WG2 Meeting #58, St. Julian's, Malta, Mar. 26-30, 2007, R2-071403.
Siemens, "Initial Access Procedure", 3GPP TSG RAN WG2 LTE Ad hoc Meeting, Cannes, France, Jun. 27-30, 2006, R2-061931.
Samsung, "LTE Random access procedure", 3GPP TSG RAN2#54, Tallinn, Estonia, Aug. 28-Sep. 2, 2006, R2-062258.
Catt, "Non-syncrhonized access and C-RNTI allocation", 3GPP WSG-RAN WG2, #55, Seoul, Korea, Oct. 9-13, 2006, R2-062933.

Ericsson, "Initial Random Access Procedure for E-UTRAN", 3GPP TSG RAN WG2, #55, Seoul, Korea, Oct. 9-13, 2006, R2-062853.
LG Electronics, "DRX Scheme", 3GPP TSG-RAN WG2 #56bis, Jan. 15-19, 2007, Sorrento, Italy, R2-070265.
Nokia, "Discontinuous reception in CELL_FACH", 3GPP TSG-RAN WG2 Meeting #58, Mar. 26, 2007, R2-071403.
LG Electronics, "Multi-level DRX Operation in CELL_PCH", 3GPP TSG-RAN WG2 #58 R2-071930, 3GPP, May 7, 2007, R2-071930, pp. 1-4.
NEC, "Fast setup for PS services (CELL PCH & URA PCH)", 3GPP TSG-RAN2 Meeting #54 Tdoc R2-062328, 3GPP, Aug. 28, 2006, R2-062328, pp. 1-6.
LG Electronics: "U-plane ciphering at MAC / Physical Layer", 3GPP TSG RAN WG2 #57bis, St. Julian's, Malta, Mar. 26-30, 2007, R2-071550.
LG Electronics: "Discussion on Message 4 in Random Access", 3GPP TSG RAN WG2 #58, Kobe, Japan, May 7-11, 2007, R2-071923.
LG Electronics: "Discussion on Message 4 in Random Access", 3GPP TSG RAN WG2 #57, St. Louis, Missour, Feb. 15-19, 2007, R2-070519.
NTT DoCoMo, Inc: "E-mail discussion on U-plane ciphering location for LTE", 3GPP TSG RAN WG2 #57bis, St. Julian's, Malta, Mar. 26-30, 2007, R2-071293.
LG Electronics: "Discussion on Message 4 in Random Access", 3GPP TSG RAN WG2 #57bis, St. Julian's, Malta, Mar. 26-30, 2007, R2-071456.
Ericsson: "MAC header for Improved L2 support for high data rates", 3GPP TSG-RAN WG2 #57, St. Louis, Missouri, Feb. 12-16, 2007, R2-0708010, XP-50133836.
NTT DoCoMo, Inc. "Views on DRX/DTX control in LTE", 3GPP TSG RAN WG2 #56, Nov. 6-10, 2006, Riga, Latvia, R2-063397, XP050132870.
Nokia. "Active mode DRX details", 3GPP TSG RAN WGx Meeting #55, Oct. 9-13, 2006, Seoul, Korea, R2-062753, XP002437990.
Email Rapporteur (Nokia), "DRX in E-UTRAN", 3GPP TSG RAN WG2 Meeting #57, Feb. 12-16, 2007, St. Louis, Missouri, R2-070463, XP050133530.
Sammour et al. U.S. Appl. No. 60/863,185.
XP002460800; Alcatel-Lucent: "Downlink Control Signaling and Multiplexing for VOIP. R1-071721" Jun. 26, 2007, pp. 1-4.
XP002602993; Nokia Corporation, Nokia Siemens Networks: "MAC header format, R2-073891", 3GPP TSG_RAN WG2 meeting 59bis, Oct. 1, 2007.
XP050134474; LG Electronics Inc: "Support for VoIP over MAC-hsEHS" 3GPP Draft; R2-071542, Apr. 2, 2007.
"Grandularity Consideration for Variable RLC PDU Sizes" Asustek; 3GPP TSG-RAN WG2 Meeting #56bis Sorrento, Italy, Jan. 15-19, 2007, XP050133423.
$3^{rd}$ Generation Partnership Project; Technical Specification Group Radio Access Network; Medium Access Control (MAC) Protocol Specification; 3GPP TS 25.321; V7.4.0 (Mar. 2007), XP050367709.
$3^{rd}$ Generation Partnership Project; Technical Specification Group Radio Access Network; Packet Data Convergence Protocol (PDCP) Specification (Release 7) 3GPP TS 25.323 V7.4.0 (Mar. 2007), XP050367856.
Bosch; "Header Compression Signalling" 3GPP Draft; Header Compression Signalling, $3^{rd}$ Generation Partnership Project (3GPP), Mobile Competence Centre; Sophia Antipolis; Nov. 29-Dec. 3, 1999, XP050114120.
Gao et al. "Research on the Access Network and MAC Technique for Beyond 3G Systems", IEEE Wireless Communications, Apr. 2007, XP011184637.
PDCP Structure and and Traffic Path, R2-073259, 3GPP TSG-RAN WG2 #59, Aug. 20-Aug. 24, 2007, Athens Greece, LG Electronics Inc.
PDCP Retransmissions, R2-073041, 3GPP TSG-RAN WG2 #59, Aug. 19-Aug. 24, 2007, Athens Greece, LG Electronics Inc.
Contents of PDCP Status Report, XP-002580785, 3GPP TSG-RAN WG2 #59, Oct. 8-Oct. 12, 2007, Shanghai, China, LG Electronics Inc.
NTT DoCoMo, Inc.; "MAC PDU structure for LTE", 3GPP TSG RAN WG2 #56bis, R2-070280, Jan. 2007, XP050133369.

(56) References Cited

OTHER PUBLICATIONS

Catt et al.; "Enhancement to Buffer Status Reporting", 3GPP TSG-RAN WG2#57bis, R2-071345, Mar. 2007, XP050134291.
LG Electronics Inc., "Relative Buffer Status Reporting", 3GPP TSG-RAN WG2 meeting #46bis, R2-050852, Apr. 4, 2005.
Panasonic, "MAC PDU format for LTE", 3GPP TSG RAN WG2#56bis, R2-070096, Jan. 15, 2007.
IPWireless; "Layer 2 functions for LTE", 3GPP TSG RAN WG2 #48bis, R2-052377, Oct. 2005.
Samsung; "Selective forwarding/retransmission during HO", 3GPP TSG-RAN2 Meeting #56bis, R2-070130, Jan. 2007.
Samsung; "Re-use of PDCP SN at ARQ level", 3GPP TSG-RAN2 Meeting #53bis, R2-061829, Jun. 2006.
Nokia, "Requirements for Redirection in E-UTRAN", 3GPP TSG-RAN WG2 Meeting #56-bis, R2-070107, Jan. 15-19, 2007.
$3^{rd}$ Generation Partnership Project; technical Specification Group Radio Access Network; Evolved Universal terrestrial Radio Access (E-UTRA) Medium Access Control (MAC) protocol specification (Release 8), 3GPP TS 36.321, Mar. 1, 2008, XP050377617.
LG Electronics Inc.: "UL Timing control related to Contention Resolution", 3GPP TSG-RAN WG2 #61bis, Shenzhen, China, Mar. 31-Apr. 4, 2008, R2-081607, XP050139334.
R2-061338 LTE Handover procedures, text proposal 3GPP TSG-RAN3 Meeting #53, Shanghai China, May 8-12, 2006 (Samsung).
Siemens: "ARQ operation and HARQ", 3GPP TSG RAN WG2#55; R2-062843, Oct. 9, 2006, pp. 1-4, XP008119562.
Nokia, Active Mode DRX, 3GPP TSG-RAN WG2#55 R2-062752, Oct. 13, 2006.
NEC, Fast setup for PS services (CELL PCH & URA PCH), 3GPP TSG-RAN WG2#53 R2-061124, May 12, 2006.
ZTE, MAC state transition, 3GPP TSG-RAN WG2#50 R2-0600 64, Jan. 13, 2006.
LG Electronics, DRX Scheme, 3GPP TSG-RAN WG2#56 R2-063248, Nov. 10, 2006.
Email Rapporteur (Nokia), DRX in E-UTRAN, 3GPP TSG-RAN WG2#57 R2-070463, Feb. 16, 2007.
"Consideration on PLMN selection and signaling free mobility", 3GPP TSG-RAN WG2 #60bis, R2-80183, Jan. 14-18, 2008, Sevilla, Spain.
Change Request; 3GPP TSG-RAN Meeting #60bis, R2-080322, Jan. 14-18, 2008, Sevilla, Spain.
Nokia: "Active mode DRX details", 3GPP TSG-RAN WGx Meeting #55, Seoul, Korea Oct. 13, 2006, XP00243990, R2-062753.
NTT DoCoMo, Inc.: "Views on DRX/DTX control in LTE", 3GPP TSG RAN WG2 #56, Nov. 10, 2006, R2-063397.
3GPP TS 25.346 V6.1.0; 3rd Generation Partnership Project; Technical Specification Group Radio Access Network; Introduction of the Multimedia Broadcast Multicast Service (MBMS) in the Radio Access Network (RAN); Stage 2 (Release 6) Jun. 2004.

\* cited by examiner

METHOD FOR TRANSITIONING BETWEEN MULTIPLE RECEPTION LEVELS

This application is a continuation of, and claims the benefit to, U.S. application Ser. No. 13/239,232, filed Sep. 21, 2011, which is a continuation of U.S. application Ser. No. 12/311,803, filed Apr. 14, 2009, which is a national phase entry of International Application No. PCT/KR2007/005368, filed on Oct. 30, 2007, and claims the benefit of U.S. Provisional Application No. 60/863,545, filed on Oct. 30, 2006, U.S. Provisional Application No. 60/884,401, filed on Jan. 10, 2007, and Korean Patent Application No. 10-2007-0023636, filed on Mar. 9, 2007, the contents of each of the above-recited applications are hereby incorporated by reference in their entireties herein. This application is related to U.S. application Ser. No. 12/491,968, filed Jun. 25, 2009.

TECHNICAL FIELD

The present invention relates to wireless communication, and more specifically, to a method for transitioning between multiple reception levels to minimize power consumption of a user equipment and to enhance quality of service in a wireless communication system.

BACKGROUND ART

Third generation partnership project (3GPP) mobile communication systems based on a wideband code division multiple access (WCDMA) radio access technique are widely deployed all over the world. High speed downlink packet access (HSDPA) that can be defined as a first evolutionary stage of WCDMA provides 3GPP with highly competitive radio access technique in the mid-term future. However, since requirements and expectations of users and service providers are continuously increased and developments of competing radio access techniques are continuously in progress, new technical evolutions in 3GPP are required to secure competitiveness in the future. Decrease of cost per bit, increase in service availability, flexible use of frequency bands, simple architecture and open interface, low power consumption of a user equipment and the like are suggested as requirements of next generation communication systems.

Paging is an activity of a network calling one or more user equipments for a certain purpose. In addition to a basic function of enabling the network to search for a user equipment, paging also has a function of enabling the user equipment to be waken up from a sleep mode. The user equipment is in the sleep mode in normal times. The user equipment wakes up only when a paging channel is arrived from the network and performs an action requested by the network.

In the sleep mode, the user equipment should periodically wake up and confirm whether the paging channel is arrived. Waking up of the user equipment at periodic intervals, not at all times, is called discontinuous reception (hereinafter, referred to as DRX).

Unlike a base station, the user equipment operates using a battery. If the battery of the user equipment is not continuously recharged, the running time of the user equipment is limited. To increase the running time, the user equipment should be designed so as to minimize power consumption when the user equipment does not actually transmit or receive data.

There are various methods to save power consumption. A first method that conforms to the design criteria established due to the limited capacity of the battery of the user equipment is to minimize the time spent for the user equipment to confirm whether any data has been arrived at the user equipment. The time spent for the user equipment to monitor a channel that notifies arrival of data to the user equipment, such as a paging channel, is minimized. A second method is to transfer user data to the user equipment with a minimum delay time when there is the user data to be transferred from the network to the user equipment. The longer the time is taken from the point when the user data is created by the network to the point when the user data actually arrives at the user equipment, the more the quality of service felt by the user is degraded. The user data arrived at the network should be transferred to the user equipment as soon as possible in order to Minimize the delay time. However, in order to reduce the delay time, the time spent for the user equipment to observe a paging channel t, such as a paging channel, should be increased.

Although the first and second methods described above are indispensable conditions for optimally operating the user equipment, they are conditions contradict to each other.

There is a need for a method for simultaneously satisfying both of the two conditions in the user equipment and the network.

DISCLOSURE OF INVENTION

Technical Problem

It is an object of the invention to provide a method for enabling a user equipment to transition between multiple reception levels through explicit signaling, thereby minimizing power consumption of the user equipment and preventing degradation in quality of service.

Technical Solution

In one aspect, there is provided a method for enabling a user equipment (UE) to transition between a non-discontinuous reception (Non-DRX) level and at least one discontinuous reception (DRX) level. The UE in a DRX level wakes up periodically to monitor a scheduling channel. The method includes receiving a URN indicator in a Non-DRX level with continuously monitoring the scheduling channel and transitioning from the Non-DRX level to a DRX level indicated by the DRX indicator.

In another aspect, there is provided a method for enabling a user equipment (UE) to transition between a plurality of reception levels. The method includes receiving transition information in a first reception level and transitioning from the first reception level to a second reception level based on the transition information.

In still another aspect, there is provided a method for enabling a user equipment (UE) to transition between a plurality of reception levels. The method includes detecting a transition condition and transitioning from a first reception level to a second reception level when the transition condition is detected. The DRX level period of the first reception level is different from that of the second reception level.

Advantageous Effects

A user equipment can transition between multiple DRX levels by an explicit command/signaling. Power consumption of the user equipment incurred by waiting when the user equipment transmits and/or receives data is minimized, and quality of service can be optimized.

MODE FOR THE INVENTION

Figure 1:
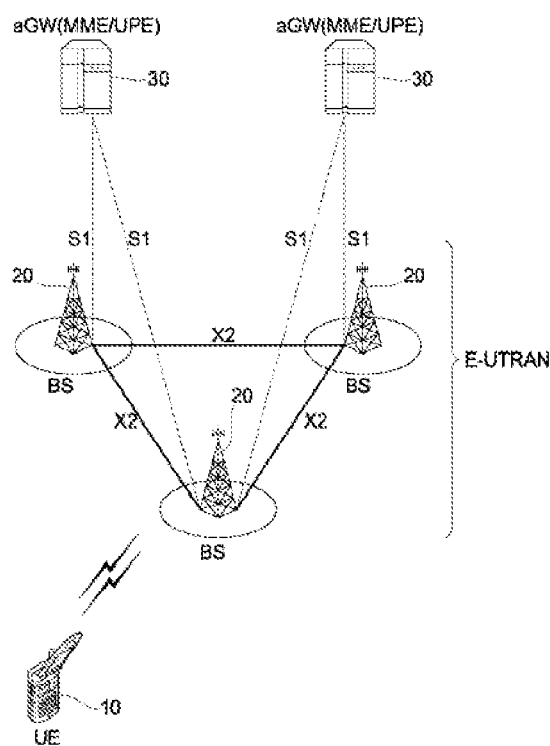
FIG. 1 is a block diagram showing a radio communication system.

FIG. 1 is a block diagram showing a wireless communication system. It can be a network structure of an evolved-universal mobile telecommunication system (E-UMTS). E-UMTS can be referred to as a long term evolution (LIE) system. The wireless communication system is widely deployed to provide a variety of communication services, such as voices, packet data, and the like.

Referring, to FIG. 1, an evolved-UMTS terrestrial radio access network (E-UTRAN) includes a base station (BS) 20. A user equipment (UE) 10 can be fixed or mobile and can be referred to as another terminology, such as a mobile station (MS), a user terminal (UT), a subscriber station (SS), a wireless device or the like. The BS 20 generally is a fixed station that communicates with the UE 10 and can be referred to as another terminology, such as an evolved-NodeB (eNB), a base transceiver system (BTS), an access point or the like. One or more cells can exist within the scope of the BS 20. An interface for transmitting user traffics or control traffics can be used between BSs 20. Hereinafter, a downlink means a communication from the BS 20 to the UE 10, and an uplink means a communication from the UE 10 and the BS 20.

The BS 20 provides termination points of the user plane and the control plane. The BSs 20 are connected to each other through an X2 interface, and adjacent base stations 20 can have a network of a meshed structure where the X2 interface always exists.

The BS 20 is connected an evolved packet core (EPC), further specifically, to an access gateway (aGW) 30, through an S1 interface. The aGAV 30 provides a termination point of a session and mobility management function of the user equipment 10. Between the BS 20 and the aGW 30, a plurality of nodes can be connected to each other in a many-to-many relation through the S1 interface. The aGW 30 can be divided into a part for processing user traffics and a part for processing control traffics. In this case, an aGW for processing traffics of a new user can communicate with an aGW for processing control traffics through a new interface. The aGW 30 is also referred to as a mobility management entity/user plane entity (MME/UPE).

Layers of the radio interface protocol between the UE and the BS can be divided into L1 (a first layer), L2 (a second layer) and L3 (a third layer) based on the lower three layers of the open system interconnection (OSI) model that is well-known to communication systems. A physical layer corresponding to the first layer provides an information transfer service using a physical channel. A radio resource control (RRC) layer placed in the third layer controls radio resources between the UE and the network. For this purpose, the RRC layer exchanges RRC messages between the UE, and the network. The RRC layer can be distributed among network nodes, such as the BS 20, the aGW 30 and the like, or can be located only in the BS 20 or the aGW 30.

The radio interface protocol includes the physical layer, a data link layer and a network layer in the horizontal plane. Or the radio interface protocol includes a user plane for transmitting data information and a control plane for transferring control signals in the vertical plane.

Figure 2:
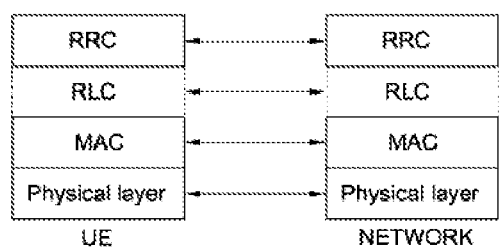
FIG. 2 is a block diagram showing a control plane of a radio interface protocol.
Figure 3:
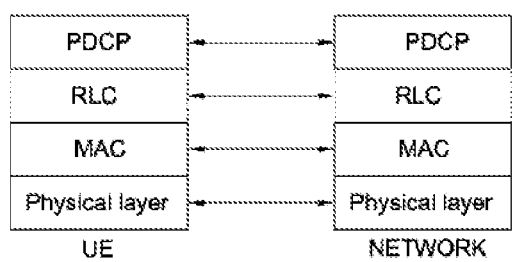
FIG. 3 is a block diagram showing a user plane of a radio interface protocol.

FIG. 2 is a block diagram showing the control plane of the radio interface protocol. FIG. 3 is a block diagram showing the user plane of the radio interface protocol. These show the structure of the radio interface protocol between a UE and a E-UTRAN based on the 3GPP radio access network specification.

Referring to FIGS. 2 and 3, a physical layer, i.e., a first layer, provides an information transfer service to upper layers using a physical channel. The physical layer is connected to a medium access control (MAC) layer, i.e., an upper layer, through a transport channel. Data are moved between the MAC layer and the physical layer through the transport channel. Between different physical layers, i.e., the physical layer of a transmitter and the physical layer of a receiver, data are moved through the physical channel.

The MAC layer of a second layer provides a service to a radio link control (RLC) layer, i.e., an upper layer, through a logical channel. The RLC layer of the second layer supports reliable data transfer. The function of the RLC layer can be implemented as a functional block within the MAC layer and in this case, the RLC layer may not exist as shown in dotted line.

A packet data convergence protocol (PDCP) of the second layer performs header compression function to reduce the size of an IP (Internet Protocol) packet header containing relatively large and unnecessary control information in order to efficiently transmit packets in a radio section of a narrow bandwidth when transmitting IP packets such as IPv4 or IPv6 packets.

A radio resource control (RRC) layer of a third layer is defined only on the control plane. The RRC layer controls the logical channel, the transport channel and the physical channel in relation with configuration, reconfiguration and release of a radio bearer (RB). The RB means a service provided by the second layer to transfer data between the UE and the E-UTRAN. The RB means a logical path provided by the first and second layers of the radio protocol to transfer data between the UE and the E-UTRAN. Generally, setting an RB means a process of specifying characteristics of the radio protocol layers and channels needed for providing a specific service and setting specific parameters and operating methods of the radio protocol layers and channels.

A downlink transport channel for transmitting data from the network to the LIE includes a broadcast channel (BCH) for transmitting system information and a downlink-shared channel (DL-SCH) for transmitting user traffics or control messages. Traffics for multicast or broadcast service or control messages can be transmitted through the DL-SCH or a separate downlink-multicast channel (DL-MCH). An uplink transport channel for transmitting data from the UE to the network includes a random access channel (RACH) for transmitting initial control messages and an uplink-shared channel (UL-SCH) for transmitting other user traffics or control messages. A paging channel (PCH) for transferring paging information is also included in the uplink transport channel.

Figure 4:
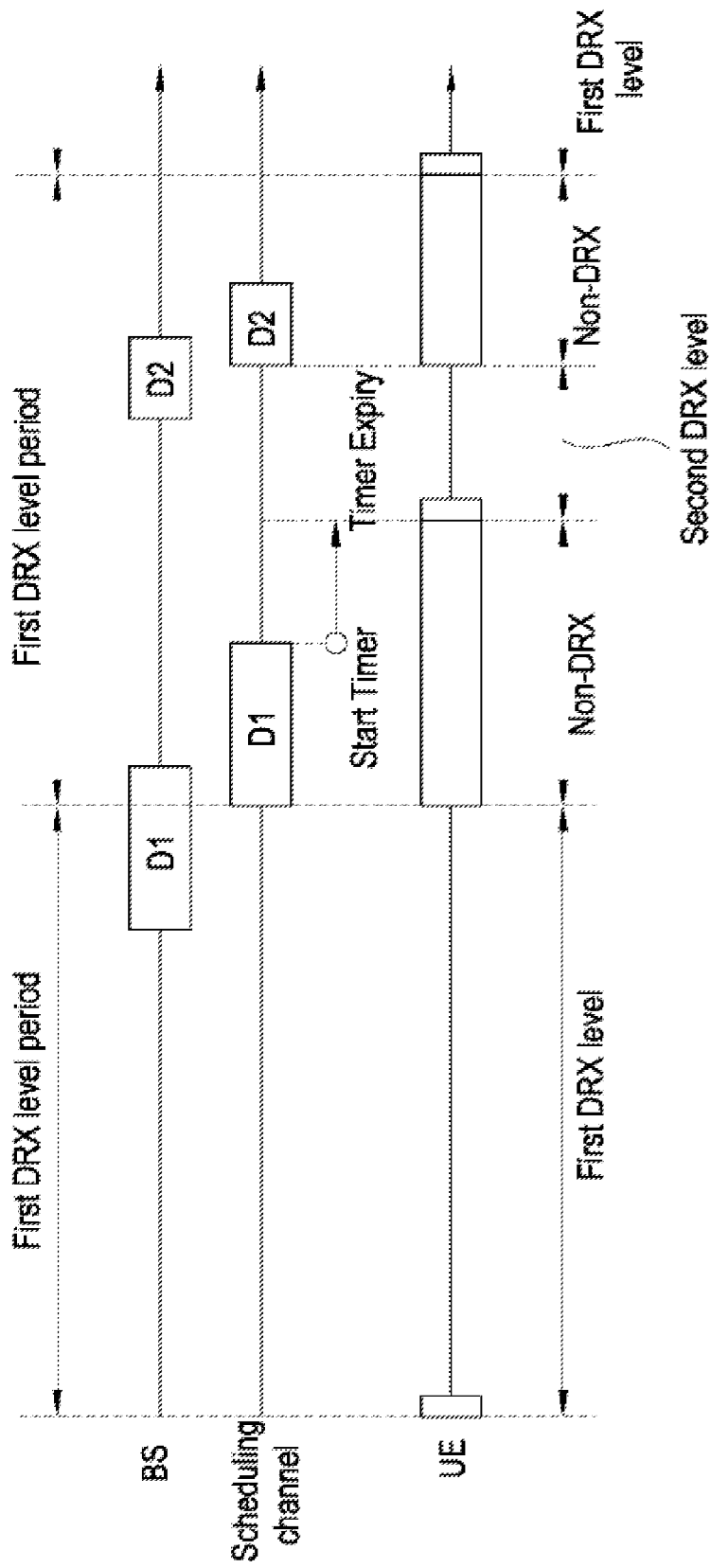
FIG. 4 is an example showing a method of receiving data according to an embodiment of the present invention.

FIG. 4 is an example showing a method of receiving data according to an embodiment of the present invention.

Referring to FIG. 4, a UE has at least two discontinuous reception (hereinafter, referred to as DRX) levels. The DRX level defines a moment for the UE to confirm arrival of downlink data. The DRX level is a reception level for reducing power consumption of the UE. The DRX level defines a period for confirming arrival of downlink data, i.e., a DRX level period. The UE confirms arrival of downlink data at every DRX level period. A time point in the DRX level period at which the UE confirms arrival of downlink data is called as a paging occasion. The paging occasion can be repeated in every DRX level period.

An interval at which radio resources are allocated to the UE is called as a transmission time interval (TTI), and the paging occasion can point a first TTI in the DRX level period.

The DRX level period of each DRX level can be different from those of other DRX levels. There is a plurality of DRX levels having DRX level periods different from each other.

Hereinafter, it is assumed that the LIE has two DRX levels, i.e., a first DRX level and a second DRX level, and the DRX level period of the first DRX level is longer than the DRX level period of the second DRX level. However, the number of DRX levels is not limited to two, but can be three or more.

The UE wakes up at the first subframe of the first DRX level and receives a scheduling channel. Here, the scheduling channel means a channel that indicates arrival of data to the UE or transmits a paging signal to the UE. The scheduling channel may be a paging indicator channel (PICH), a paging channel (PCH), an L1/L2 control channel and the like.

In FIG. 4, since the LIE cannot find its information from the first subframe of the first DRX level, it enters into a sleep mode during the remaining DRX level period.

Next, the UE wakes up at the first subframe of the first DRX level period and receives the scheduling channel. If the BS has a first data D1 to transmit, the BS informs the UE of the existence of the first data in line with the starting point of the first DRX level period through the scheduling channel. The UE recognizes that it has been scheduled and operates in a non-discontinuous reception (Non-DRX) level. The Non-DRX level may also be called as a continuous reception level. In the Non-DRX level, the UE continuously receives a channel directing to receive data or a channel informing arrival of data to be transferred to the UE. If the BS has the first data D1 to transmit, the BS informs the UE of the existence of the first data through the scheduling channel. The LIE recognizes the scheduling channel, enters into the Non-DRX level, and receives the first data D1 as indicated by scheduling information.

After completing transmission of the first data D1, the BS transmits a DRX indicator to the UE to inform that the UE does not need to continuously receive the scheduling channel any more.

The DRX indicator directs the UT, to transition to a new reception level. The DRX indicator becomes a transition condition for transitioning the UE to the new reception level. The new reception level can be a new DRX level or a new Non-DRX level. The BS can direct the to transition from the Non-DRX level to the first or second DRX level through the DRX indicator. In the example of FIG. 4, the DRX indicator directs the UE to transition to the second DRX level and the UE transitions from the Non-DRX level to the second DRX level as indicated by the DRX indicator. If the second DRX level is not set, the UL can transition to the first DRX level.

While operating in the second DRX level, the UE wakes up at the first subframe of each second DRX level period and receives the scheduling channel. If the BS has a second data D2 to transmit, the BS informs the UE of the existence of the second data D2 in line with the second DRX level period through the scheduling channel. The UE recognizes the scheduling channel, enters into the Non-DRX level and receives the second data D2. Since the second DRX level period is shorter than the first DRX level period, the BS can transmit the second data D2 at further short intervals.

If the UE cannot find its information from the scheduling channel during the remaining period of the second DRX level period, the UE does not receive the scheduling channel in the remaining period. The UE wakes up at the first subframe of each second DRX level period and receives the scheduling channel. If it cannot find its information from the first subframe of the second DRX level period, the UE does not receive the scheduling, during the remaining, of the second DRX level period of the corresponding second DRX level.

If a certain condition is satisfied while operating in the second DRX level, the UE can transition to the first DRX level again. Here, it is shown in the figure that as soon as the second period of the first DRX level period is over at the BS, i.e., the third period of the first DRX level period starts, the UE stops operating in the second DRX level and transitions to the first DRX level.

At least two or more reception levels are defined between the network and the UE.

The reception level means a reception state of the UE, which can be a Non-DRX level or a DRX level. When a transition condition is satisfied, the UE can transition between the reception levels.

The reception levels are transitioned by an explicit command or an explicit signaling.

One example of the transition condition for transitioning between the reception levels is that the UE receives a DRX indicator. The DRX indicator can direct the UE to transition to another DRX level. Also the DRX indicator can direct the UE to transition to the Non-DRX level. The DRX indicator can contain information indicating to which reception level the UE should transition among a plurality of reception levels. If the UE receives the DRX indicator on whether the UE should transition to a specific DRX level, the UE transitions to the DRX level directed by the DRX indicator.

The DRX indicator can contain information indicating when the UE transitions to a new DRX level. The DRX indicator can contain a start time of the new DRX level. If the DRX indicator contains information indicating when the UE should transition to the new DRX level, the UE can transition to the new DRX level at the time directed by the information.

The DRX indicator can be transmitted through the L1/L2 control channel. Alternatively, the DRX indicator can be transmitted through a MAC message and the DRX indicator can be contained in the MAC header. The DRX indicator contained in the MAC header can be contained in the MAC protocol data unit (PDU) in the form of control information. The DRX indicator can be transmitted through an RRC message.

Another example of the transition condition is that the UE receives a setting value of a new reception level. The BS can inform the UE of the setting value when the network and the UE initially establish a call or reestablish the call. The setting value can be a value related to a DRX level period used in each DRX level. Alternatively, the setting value can be information indicating when a DRX level period begins in each DRX level. The setting value can be transferred through an RRC message.

Still another example of the transition condition is that the UE does not receive data for a specific period of time, or the UE is not notified for a specific period of time with arrival of data that the UE should receive through a channel directing the UE to receive data or a channel informing existence of data to be transferred to the UE.

Still another example of the transition condition is that the UE transmits data through an uplink channel. This is a case where the UE transmits a message for requesting radio resources to the uplink channel or transmits user data or a control message through the uplink channel.

Still another example of the transition condition is starting of a new DRX level period of a DRX level that is different from the DRX level in which the UE is currently stays.

Still another example of the transition condition is starting of a new DRX level period of another DRX level having a DRX level period that is longer than the DRX level period of the DRX level in which the UE is currently stays.

If a transition condition is occurred and the UE transitions to a new DRX level, the new DRX level can be applied from a specific time. The specific time can be a time point at which a new period of the new DRX level starts. When the UE transitions to the new DRX level, the UE can maintain the currently used DRX level until the new period of the new DRX level is started.

In each DRX level, the UE receives a scheduling channel which directs the UE to receive data or informs existence of data to be transferred to the UE at predetermined time periods. After receiving the scheduling channel, if the UE is notified with existence of data arrived at the UE or receives information on radio resources that the UE should receive, the LIE can transition to a new reception level. For example, the UE can transition to the Non-DRX level. If the BS notifies the UE that there is no data arrived at the UE or the UE is not notified with information on radio resources that the UE should receive, the UE does not receive the scheduling channel until the next predetermined time period based on the DRX setting value.

In each DRX level, the BS can transmit a DRX indicator directing to receive data or commanding to prepare to receive data only at predetermined time periods through the scheduling channel. After receiving the DRX indicator, the LIE can transition to a new reception level. For example, the network and the UE can transition to the Non-DRX level. If the BS notifies the UE that there is no data arrived at the UE or does not notify the UE of information on radio resources that the UE should receive, the BS may not transmit the DRX indicator until the next predetermined dine period based on the DRX setting value.

The predetermined time period can be a paging occasion. The paging occasion repeats in every DRX level period. The paging occasion is the first TTI of the DRX level period.

Hereinafter, a plurality of reception levels and transitions therebetween is described with examples.

A network and a UE can set three reception levels. The three reception levels include a Non-DRX level and two DRX levels (a first DRX level and a second DRX level). The network and the UE transition from the current reception level to the next reception level if a certain condition is satisfied. Then, they set a method of receiving a downlink channel based on the setting value set to each of the reception levels.

In the Non-DRX level, the UE continuously receives a scheduling channel directing the UE to receive data or informing existence of data to be transferred to the UE. In the Non-DRX level, the UE continuously receives the scheduling channel at every time period.

In the first DRX level, the UE receives the scheduling channel at every paging occasion based on the DRX setting value, (DRX level period). If existence of data to be transferred to the UE is indicated or information on allocation of radio resources that the UE should receive is received in the paging occasion, the UE can transition to the Non-DRX.

In the second DRX level, the UE receives a scheduling channel directing the UE to receive data at every paging occasion based on the DRX setting value. If existence of data to be transferred to the UE is indicated or information on allocation of radio resources that the UE should receive is received in the paging occasion, the UE can transition to the Non-DRX level. Alternatively, the UE can transition from the second DRX level to the first DRX level.

In the second DRX level, the UE receives a scheduling channel directing the UE to receive data at every paging occasion based on the DRX setting value. If existence of data to be transferred to the UE is indicated or information on allocation of radio resources that the UE should receive is received in the paging occasion, the UE can perform continuous reception only for a corresponding, period of the second DRX level. During the whole corresponding period, the UE can receive the scheduling channel.

One example of the transition condition for the UE to transition from the Non-DRX level to the second DRX level is that the UE receives a DRX indicator directing to transition to the second DRX level from the BS. Another example is that the UE does not receive data from the BS for a certain period of time or does not receive scheduling information. Still another example is that the UE receives a setting value for a new Non-DRX level. Still another example is that while the UE does not receive data for a certain period of time or information on data scheduling of the UE from the BS, the UE arrives at the first subframe of the second DRX level period.

One example of the transition condition for the UE to transition from the second DRX level to the first DRX level is that the UE does not receive data from the BS for a certain period of time or does not receive scheduling information. Another example is that the UE does not receive data from the BS or does not receive information on data scheduling for the UE. Still another example is that the UE arrives at the first subframe of the first DRX level period. Still another example is that the UE receives a DRX indicator directing to transition to the first DRX level from the BS. Still another example is that the UE receives a setting value for a new Non-DRX level.

If the UE has a plurality of reception levels, power consumption of the UE can be adjusted depending on the amount of user data transmitted to the UE. In an example of normally visiting a web page in Internet browsing, after downloading a web page, a user does not move to the next page while viewing the screen for quite some time. Data of the web page are transmitted to the user all together. However, some of the data, e.g., a few pictures configuring the web page, are delayed when being transmitted to the user depending on situation. In this situation, the LIE operates in the Non-DRX level when the screen is transmitted at a time, transitions to the second DRX level in which some of the data can be delayed in the next stage, and finally, transitions to the first DRX level in which data transmission is almost needless while the user views the web page. If the number of DRX levels of the UE is large, power consumption of the UE can be reduced by differentiating DRX levels in accordance with the flow of the user data. Furthermore, degradation in quality of service felt by the user also can be minimized.

Figure 5:
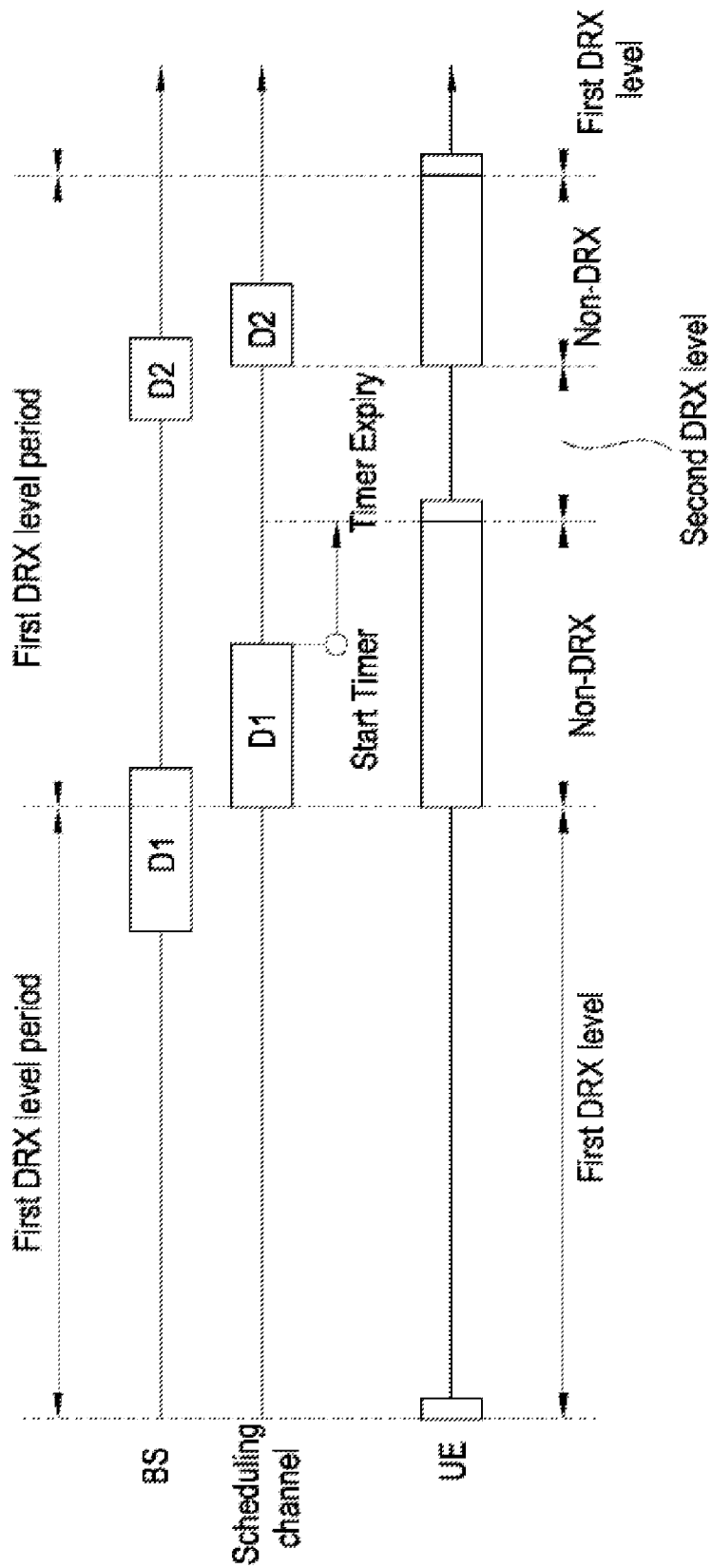
FIG. 5 is an example showing a method of receiving data according to another embodiment of the present invention.

FIG. 5 is an example showing a method of receiving data according to another embodiment of the present invention. A timer is used to transition between reception levels.

Referring to FIG. 5, a UE is initially in a first DRX level, if a BS has a first data D1 to transmit, the BS informs the UE of the existence of the first data in line with a first DRX level period through a scheduling channel. The UE recognizes the scheduling channel, enters into a Non-DRX level, and receives the first data D1.

After transmission of the first data D1 is completed, a transition timer starts. If the UE does not receive its information through the scheduling channel until the transition timer expires, the UE can transition to another reception level. Here, when the transition timer expires, the UE transitions from the Non-DRX level to a second DRX level. The duration of the transition timer can be stored in a memory, can be informed to the UE by the BS or can be assigned by the UE and informed to the BS.

Figure 6:
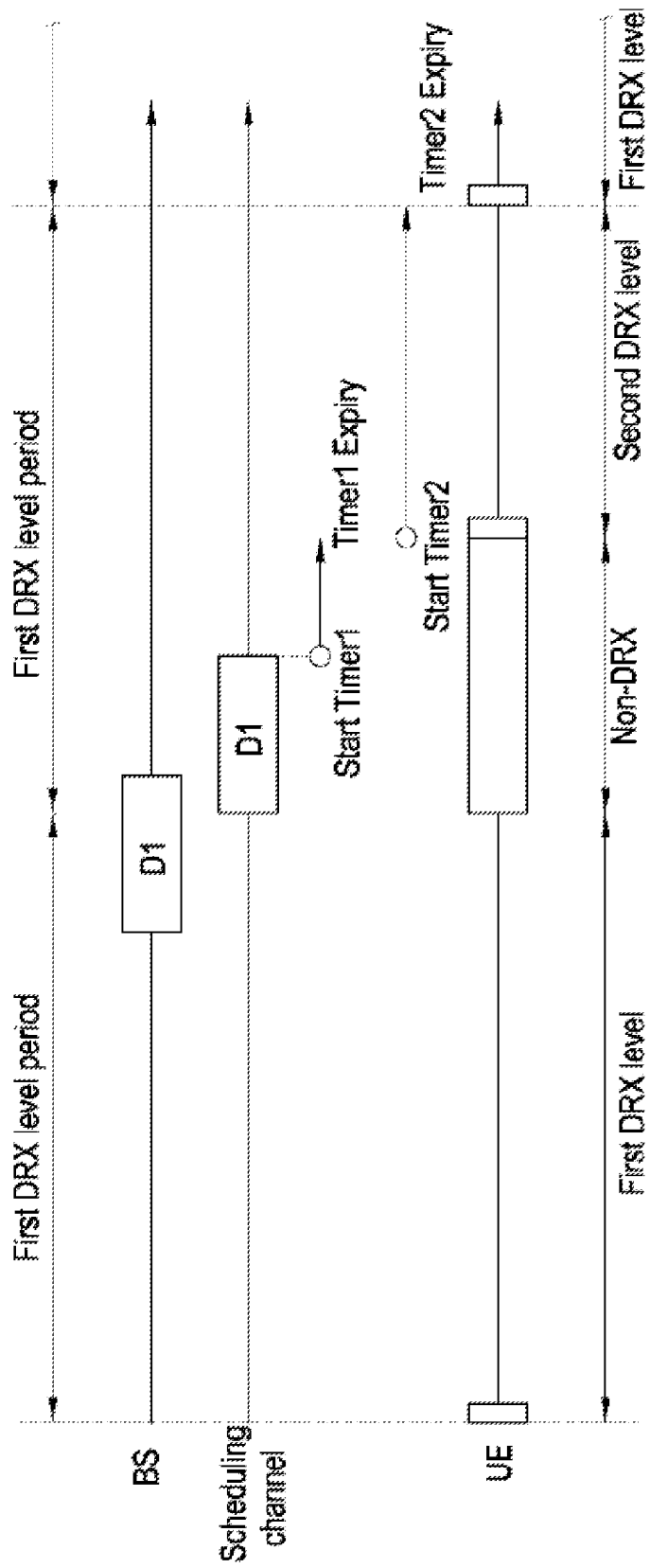
FIG. 6 is an example showing a method of receiving data according to still another embodiment of the present invention.

FIG. 6 is an example showing a method of receiving data according to still another embodiment of the present invention. A plurality of timers is used for transitioning between reception levels.

Referring to FIG. 6, a UE is initially in a first DRX level. If a BS has a first data D1 to transmit, the BS informs the UE of the existence of the first data in line with a first DRX level period through a scheduling channel. The UE recognizes the scheduling channel, enters into the Non-DRX level and receives the first data D1.

After transmission of the first data D1 is completed, a first transition timer starts. If the UE does not receive its information through the scheduling channel until the first transition timer expires, the UE can transition to another reception level. Here, when the first transition tinier expires, the UE transitions from the Non-DRX level to a second DRX level.

When the UE transitions to the second. DRX level, a second transition timer starts. If the UE does not receive its information through the scheduling channel until the second transition timer expires, the UE can transition to another reception level. Here, if the second transition timer expires, the UE transitions from the second DRX level to the first DRX level.

Figure 7:
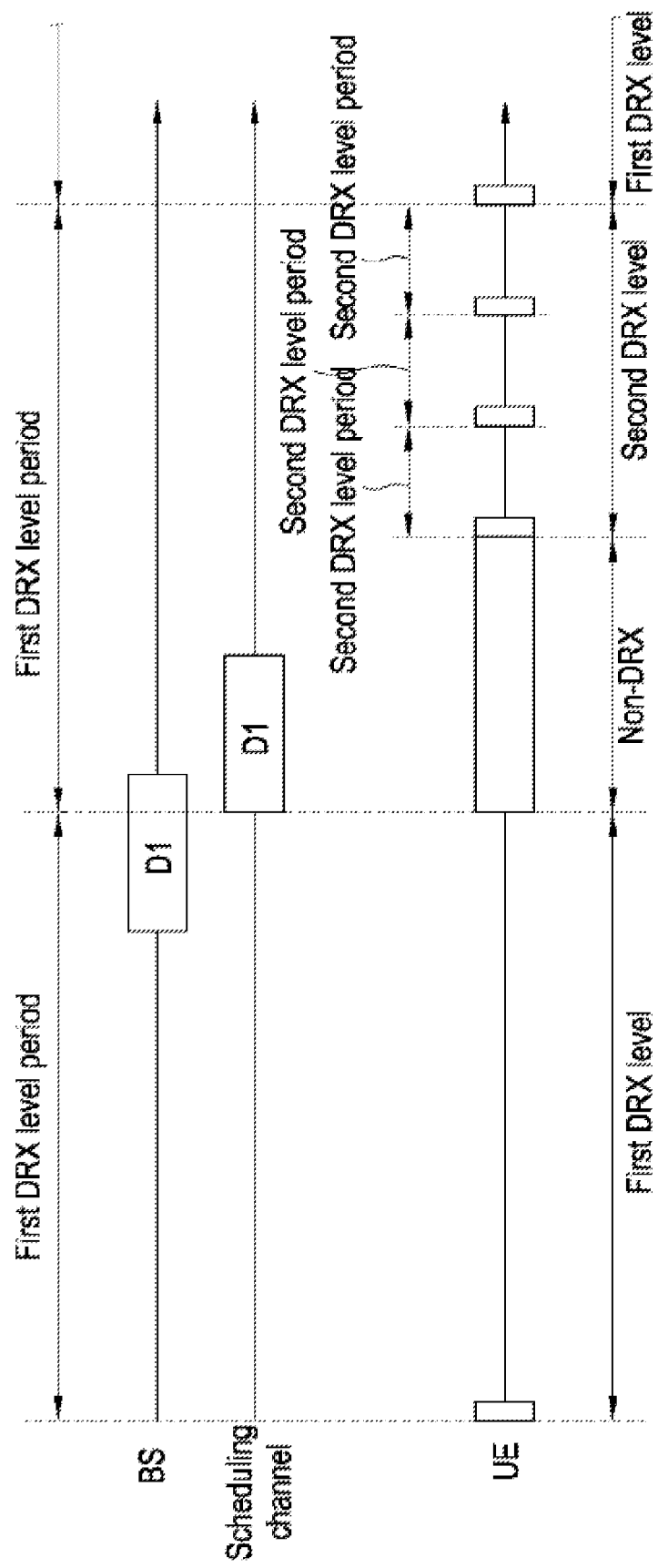
FIG. 7 is an example showing a method of receiving data according to still another embodiment of the present invention.

FIG. 7 is an example showing a method of receiving data according to still another embodiment of the present invention. A predetermined number of DRX level periods are processed for transitioning between reception levels.

Referring to FIG. 7, a UE is initially in a first DRX level. If a BS has a first data D1 to transmit, the BS informs the UE of the existence of the first data in line with the first DRX level period through a scheduling channel. The UE recognizes the scheduling channel, enters into a Non-DRX level and receives the first data D1.

After transmission of the first data D1 is completed, the UE transitions to a second DRX level. The transition can be performed by a DRX indicator or a timer. If the UE does not receive its scheduling information for a predetermined number of second DRX level periods, the HE transitions to the first DRX level. Here, the UE transitions to the first DRX level after three second DRX level periods are elapsed.

The number of DRX level periods can be a value that is previously known both the BS and the UE or can be informed to the UE by the BS or vice versa.

Figure 8:
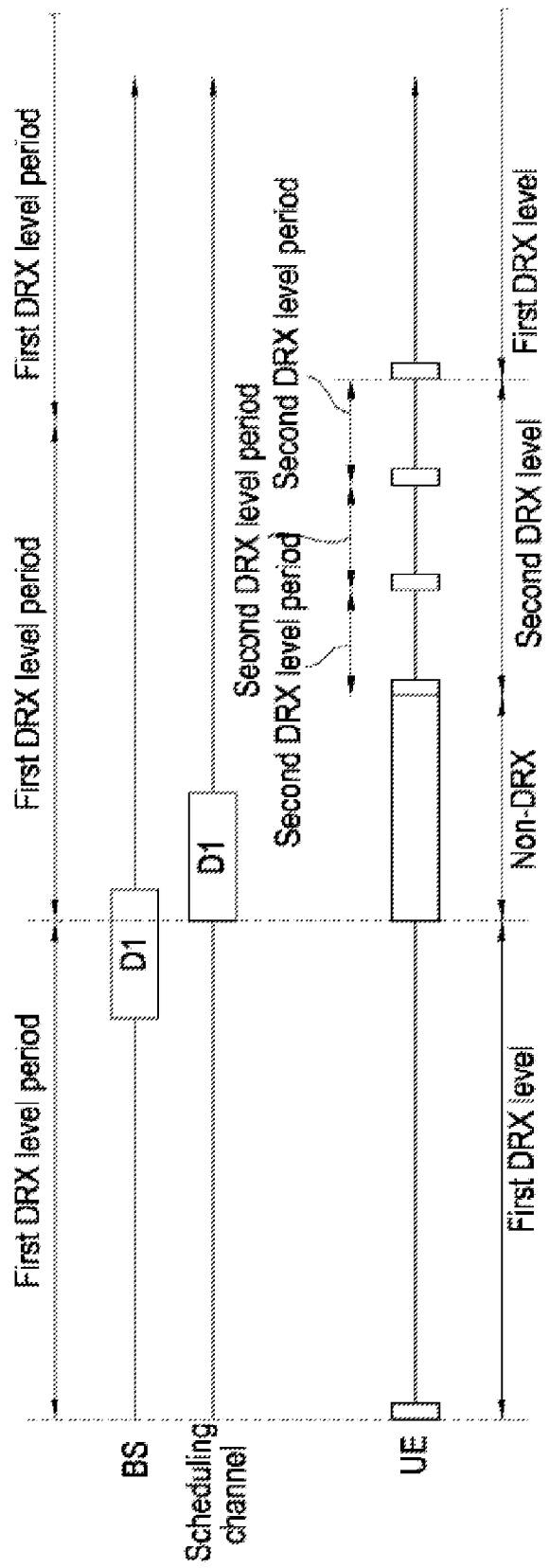
FIG. 8 is an example showing a method of receiving data according to still another embodiment of the present invention.

FIG. 8 is an example showing a method of receiving data according to still another embodiment of the present invention. This is a case where a first DRX level is not synchronized with a second DRX level.

Referring to FIG. 8, if a UE does not receive its scheduling information for a predetermined number of second DRX level periods, it transitions to a first DRX level. Here, the UE transitions to the first DRX level after three second DRX level periods are elapsed. At this point, the UE transitions to the first DRX level immediately after the predetermined number of the second DRX level periods is elapsed.

Figure 9:
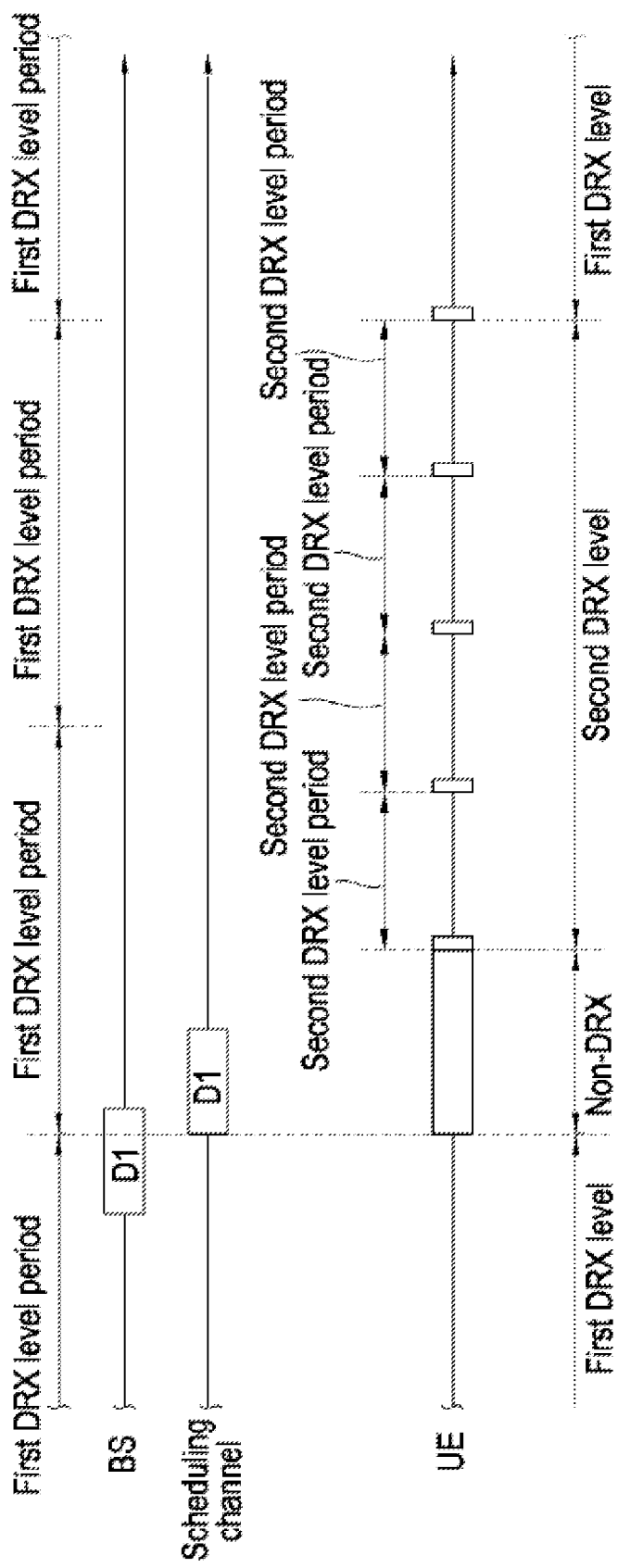
FIG. 9 is an example showing a method of receiving data according to still another embodiment of the present invention.

FIG. 9 is an example showing a method of receiving data according to still another embodiment of the present invention. This is a case where a first DRX level is synchronized with a second DRX level.

Referring to FIG. 9, although a UE does not receive its scheduling information for a predetermined number of second DRX level periods, it continues to be in a second DRX level until a first DRX level is synchronized. It is assumed that the number of the second DRX level periods is set to three, and if the first DRX level is not synchronized even after three second DRX level periods are elapsed, the second DRX level is continued until a new first DRX level period is started. At this point, the set number of the second DRX level periods means a minimum number of repetitions.

Figure 10:
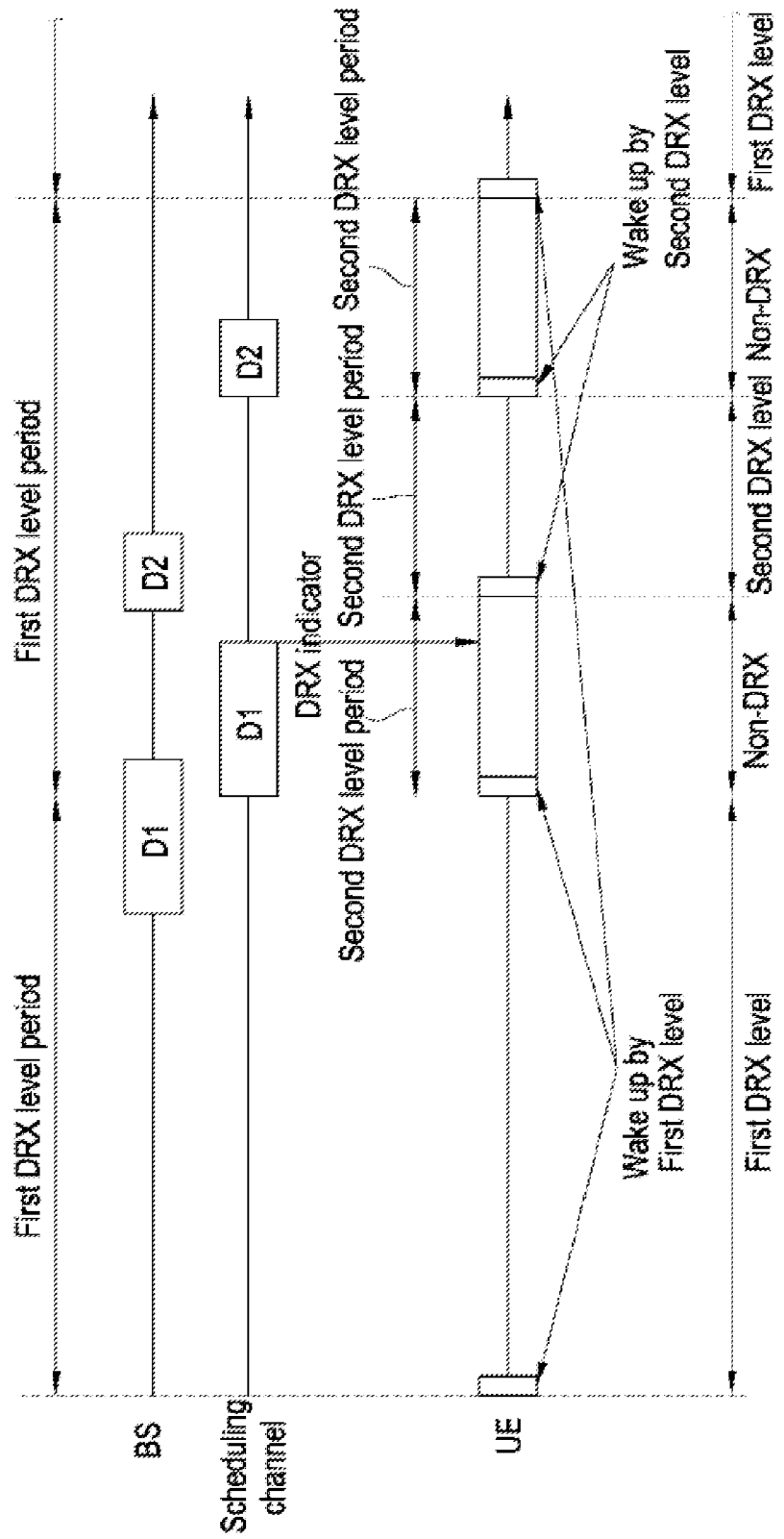
FIG. 10 is an example showing a method of receiving data according to still another embodiment of the present invention.

FIG. 10 is an example showing a method of receiving, data according to still another embodiment of the present invention.

Referring to FIG. 10, a starting point of a DRX level period is previously determined. Accordingly, although a UE receives a DRX indicator after transmission of first data D1 is completed, it does not immediately stop receiving a scheduling channel but the UE maintains the Non-DRX level until next second DRX level period is arrived. Thereafter, the UE transitions to a second DRX level in line with the start of a second DRX level period. Although a BS transmits a DRX indicator directing transition to the second DRX level after transmitting the first data D1, the UE transitions form a Non-DRX level to the second DRX level at a time point when the next second DRX level period is started.

Next, while operating in the second DRX level, if the UE receives its information in the first period of the second DRX level period through the scheduling channel, it transitions to the Non-DRX level again.

The network and the UE can previously know the starting point and/or the interval of a DRX level period. Or the network can transmit information on the starting point and or the interval to the UE. If the starting point and/or the interval of a DRX level are set, when the UE transitions from one reception level to another reception level, it can be known that when the UE transitions to another reception level and from when the UE receives the first subframe of the new reception level. If a condition for transitioning the UE from a reception level to a new reception level is satisfied, the UE does not immediately transition to the new reception level, but transitions in line with the starting point of the newly set reception level. That is, the UE does not transition to the new reception level at any time, but the new reception level begins to be applied only to a predetermined time period based on the starting point and the interval of each reception level.

The UE having received second data D2 transitions form the Non-DRX level to the first DRX level when a new first DRX level period starts. While staying in a reception level, the UE can transition from the reception level to a new DRX level if a new starting point of a DRX level different from the current reception level is arrived. For example, while the UE operates in the second DRX level and a certain condition is satisfied, if a new starting point of the first DRX level is arrived, the UE transitions to the first DRX level. Here, the certain condition can be that the UE does not receive its scheduling information for a certain period of time in the current reception level.

If the starting point of each DRX level is previously set, although the UE does not separately receive an indicator, such as a DRX indicator, and the settings of the UE and the BS do not match to each other, the affect of the mismatch can be minimized. Although the UE misses the DRX indicator in a reception level, the UE wastes battery power as much as the first DRX level period in maximum. Therefore, it is advantageous for the UE and the BS to previously know the starting point of a DRX level period. For this purpose, when a certain condition is satisfied and the UE transitions to a new DRX level, the UE does not immediately transition to the new DRX level, but only needs to transition in line with the starting point of the new DRX level period.

For example, an operation described below is also possible.

1) A BS sets a first DRX level period and a second DRX level period of a UE.
2) In a first subframe of the first DRX level period, the UE examines a L1/L2 control channel to confirm whether data has been arrived at the UE.
3) If data has been arrived at the UE, the UE
   (1) receives the data based on scheduling information, and
   (2) continuously monitors the L1/L2 control channel until a DRX indicator is received, and if the BS informs existence of data through the L1/L2 control channel, receives the data based on scheduling information.
   (3) If a DRX indicator is received, the UE
      A) starts to operate in a second DRX level until the next first DRX level period is arrived, and
      B) receives the first subframe of each second DRX level period while operating in the second DRX and examines the L1/L2 control channel to confirm whether data has been arrived at the UE.
      C) If it is confirmed that data has been arrived at the UE, the UE
         i) receives the data based on scheduling information, and
         ii) receives the L1/L2 control channel until there is no more data for the UE to receive.
      D) If the UE confirms that it is not scheduled any more through the L1/L2 control channel, the UE enters into a sleep mode until the first subframe of either of the second DRX level period or the first DRX level period, which arrives first, is arrived,
4) If any data has not been arrived at the UE in the first subframe of the first DRX level period, the UE operates in a sleep mode until the first subframe of the next first DRX level period is arrived.

While operating in a DRX level, if it is directed to receive data or notified with existence of data to receive, through a scheduling channel or the like a UE transitions to a Non-DRX level. Thereafter, if the UE receives a DRX indicator, it transitions to a new reception level, a new DRX level. The UE can update a currently used DRX setting value with a newly received DRX setting value.

A BS can additionally inform that when the new DRX setting value starts to be applied. When the UE receives the new DRX setting value, the new setting value is used from a time point directed by the BS.

A Non-DRX level is, in other words, the same as a DRX level period of zero. Accordingly, if a new DRX level period value of the UE is set to zero, the UE can operate in the Non-DRX level until a new DRX level period value is set.

Figure 11:
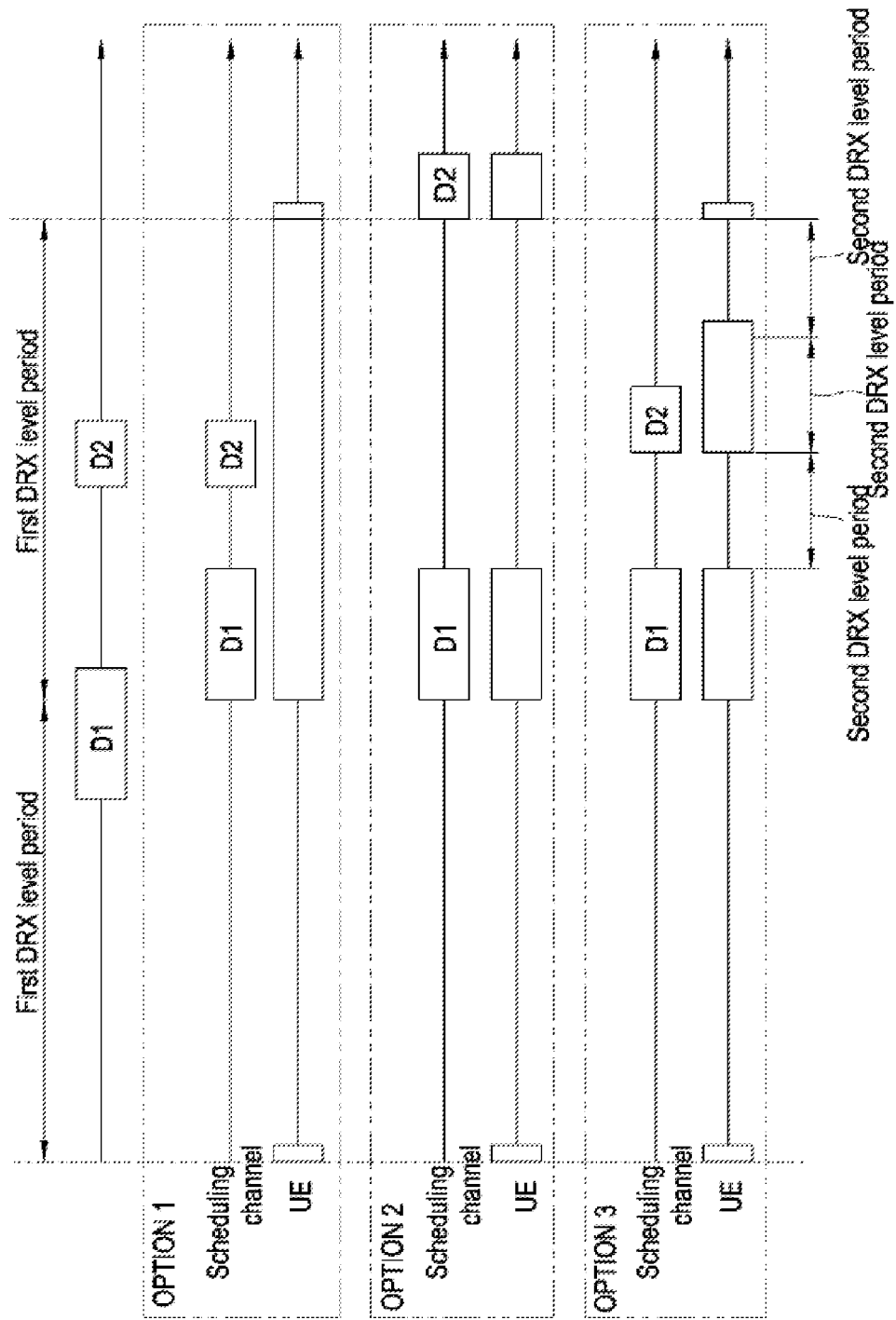
FIG. 11 is an example showing a method of receiving data according to still another embodiment of the present invention.

FIG. 11 is an example showing a method of receiving data according to still another embodiment of the present invention.

Referring to FIG. 11, there is a plurality of operation modes in a UE depending on the number and operation of reception levels. In 'OPTION 1' mode, the UE has a DRX level and a Non-DRX level without a sleep mode. In 'OPTION 2' mode, the UE has a DRX level and a Non-DRX level with a sleep mode. In 'OPTION 3' mode, the UE has two DRX levels and a Non-DRX level. Three operation modes are described here, but there may be more than two or four operation modes.

In the 'OPTION 1' mode, the UE wakes up at the second period of the first DRX level period. At the first subframe of the second period of the first DRX level period, the UE confirms existence of its data through scheduling information and enters into the Non-DRX level. The UE receives data during the entire second period of the first DRX level period where it has waken up. If its data is not in the first subframe of the third period of the first DRX level period, the UE transitions to the DRX level again.

In the 'OPTION 2' mode, the UP wakes up at the second period of the first DRX level period. At the first subframe of the second period of the first DRX level period, the UE confirms existence of its data through scheduling information and enters into the continuous reception level. While continuously receiving data after waking up, if the UE is not scheduled any more, it immediately transitions to the sleep mode. If its data is in the first subframe of the third period of the first DRX level period, the UE continuously receives data again. If its data is not in the first subframe of the third period of the first DRX level period, the UE transitions to the DRX level again.

In the 'OPTION 3' mode, the UE wakes up at the second period of the first DRX level period. At the first subframe of the second period of the first DRX level period, the UE confirms existence of its data through scheduling information and enters into the continuous reception level. While continuously receiving data after waking up, if the UP is not scheduled any more, it automatically transitions to the second DRX level. Next, the UE receives the first subframe of every second DRX level period until the next first DRX level period starts. If the UE is scheduled in the first subframe of the second DRX level period, it wakes up and continuously receives data during the entire second DRX level period. If its data is not in the first subframe of the third period of the first DRX level period, the UP transitions to the first DRX level again.

Hereinafter, a DRX method related to uplink transmission is described.

Generally, when a UE transmits data or a control message to a BS, a response message is immediately transmitted from the BS. At this point, it is advantageous to use a DRX level having short DRX level period or a Non-DRX level.

If the UE transmits data or a control message to the BS, the UE changes a reception level that is being used. A new reception level can be the Non-DRX level or a new DRX level. When the UE transitions to a new reception level after performing uplink transmission, the new reception level is previously determined when a call is established or reestablished. For example, after performing uplink transmission in the first DRX level, the UE can transition to the second DRX level. Alternatively, after performing uplink transmission in the first DRX level, the UK can transition to the Non-DRX level.

When the UE requests to allocate radio resources, it can transition to the Non-DRX level. For example, if the UE uses an RACH, it transitions to the Non-DRX level after transmitting a preamble. If radio resources for transmitting data or a control message is allocated to the UE through the scheduling channel as a response to the RACH, the UE can transition to a second DRX level.

Figure 12:
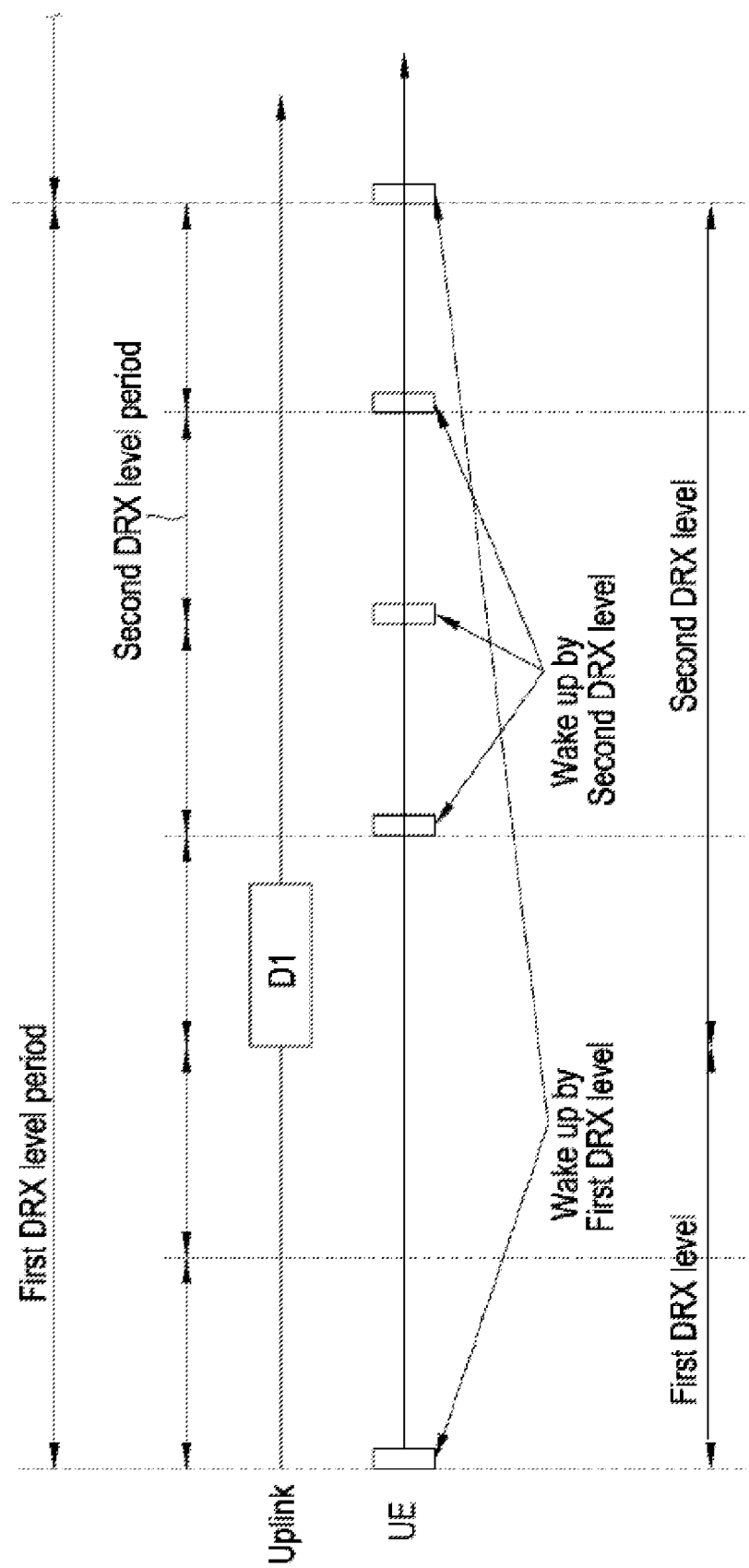
FIG. 12 is an example showing a method of transmitting data according to an embodiment of the present invention.

FIG. 12 is an example showing a method of transmitting data according to an embodiment of the present invention.

Referring to FIG. 12, a UE is initially in a first DRX level. The UE transmits data DU to a BS. After transmitting data D1 to the uplink while operating in the first DRX level, the UE transitions to a second DRX level. Alternatively, the UE can transition to a Non-DRX level, not to the second DRX level, depending on setting. The time point when the UK transmits data to the uplink can be the same as the time point when the UE transitions to the second DRX level, or the former can precede the latter, or the latter can precede the former.

After transitioning to the second DRX level, the UE searches for the first subframe of every second DRX levels and confirms whether its data is transmitted from the BS. After transitioning to the second DRX level, if the UE does not receive any data from the downlink for a certain period of time or does not receive any information, through the scheduling channel, the UE transitions to the first DRX level again. If the UE endlessly operates in the second DRX level after transitioning to the second DRX level after the uplink transmission, it can cause a bad effect on the power consumption of the UE. The certain period of time is counted using a timer after the UE performs transmission, or the certain period of time may mean the number of the second DRX level periods in which the UE stays after performing transmission. The certain period of time of the UE can be set through a call establishment or call reestablishment.

While operating in the second DRX level, the UE can transition to the first DRX level again at the starting point of the first DRX level period. Alternatively, a DRX indicator can be used.

The steps of a method described in connection with the embodiments disclosed herein may be implemented by hardware, software or a combination thereof. The hardware may be implemented by an application specific integrated circuit (ASIC) that is designed to perform the above function, a digital signal processing (DSP), a programmable logic device (PLD), a field programmable gate array (FPGA), a processor, a controller, a microprocessor, the other electronic unit, or a combination thereof. A module for performing the above function may implement the software. The software may be stored in a memory unit and executed by a processor. The memory unit or the processor may employ a variety of means that is well known to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

What is claimed is:

1. A method for enabling a user equipment (UE) to transition between a non-discontinuous reception (Non-DRX) level and one of a plurality of discontinuous reception (DRX) levels, the method comprising:
  receiving configuration information for each of the plurality of DRX levels;
  after receiving the configuration information, receiving a DRX indicator while the UE is operating in a Non-DRX level and continuously monitoring the scheduling channel, wherein the DRX indicator indicates one DRX level of the plurality of DRX levels, and wherein each of the plurality of DRX levels has a different DRX period based on the configuration information; and
  transitioning from the Non-DRX level to the one DRX level of the plurality of DRX levels indicated by the DRX indicator.

2. The method of claim 1 further comprising:
  when the one DRX level of the plurality of DRX levels is a short DRX level, transitioning from the short DRX level to a long DRX level when a predetermined time is passed after transitioning from the Non-DRX level to the short DRX level.

3. The method of claim 1, wherein the DRX indicator is received through a medium access control (MAC) message.

4. A user equipment (UE) configured to transition between a non-discontinuous reception (Non-DRX) level and one of a plurality of discontinuous reception (DRX) levels, the UE comprising:
  a processor; and a memory operatively coupled with the processor and storing instructions that when executed by the processor causes to the UE to:
  receive configuration information for each of the plurality of DRX levels,
  after receiving the configuration information, receive a DRX indicator while the UE is operating in a Non-DRX level and continuously monitoring the scheduling channel, wherein the DRX indicator indicates one DRX level of the plurality of DRX levels, and wherein each of the plurality of DRX levels has a different DRX period based on the configuration information; and
  transition from the Non-DRX level to the one DRX level of the plurality of DRX levels indicated by the DRX indicator.

5. The UE of claim 4, wherein when the one DRX level of the plurality of DRX levels is a short DRX level, the memory stores further instructions that when executed by the processor causes to the UE to transition from the short DRX level to a long DRX level when a predetermined time is passed after transitioning from the Non-DRX level to the short DRX level.

6. The UE of claim 4, wherein the DRX indicator is received through a medium access control (MAC) message.

* * * * *